United States Patent Office 3,696,088
Patented Oct. 3, 1972

3,696,088
HYDROGENATION PROCESS
Albert N. De Vault, Bartlesville, Okla., assignor to Phillips Petroleum Company
No Drawing. Filed Sept. 11, 1970, Ser. No. 71,629
Int. Cl. C08d 5/00; C08f 27/24, 27/25
U.S. Cl. 260—85.1    5 Claims

ABSTRACT OF THE DISCLOSURE

Unsaturated polymers such as butadiene-styrene copolymers are hydrogenated in solution using a soluble organometal catalyst system in a reactor in which the solution of polymer and catalyst is trickled over a bed of inert packing in a hydrogen atmosphere.

BACKGROUND OF THE INVENTION

This invention relates to the continuous hydrogenation of unsaturated polymers. In accordance with another aspect, this invention relates to an improved continuous process for the hydrogenation of polymeric feeds containing unsaturated polymer and a homogeneous catalyst system by hydrogenating the feed in a liquid trickle phase in a column packed with inert contacting materials. In accordance with a further aspect, this invention relates to a continuous trickle bed hydrogenation of butadiene-styrene copolymers by passing same over a bed of packing in a hydrogen atmosphere along with the soluble hydrogenation catalyst.

The catalytic reduction of unsaturated hydrocarbons including polymers is well known. However, these systems are, for the most part, heterogeneous as, for example, hydrogenation with certain insoluble metal oxide catalysts, or the hydrogenation as carried out in a batch operation such as an autoclave. It is well recognized that solid catalyst systems which are greatly effective for hydrogenating normally liquid unsaturated materials such as benzene will hydrogenate unsaturated polymeric materials only with great difficulty. Soluble homogeneous hydrogenation catalyst systems, on the other hand, are very effective with relatively low molecular weight feeds and moderately effective with heavy feeds such as unsaturated polymers, but the latter require relatively long reaction times in batch-type autoclaves for complete or near complete hydrogenation. If continuous operation is attempted, such as by autoclave operation using a continuous feed and a continuous discharge, the hydrogenation of the product can, of course, never be complete. The discharge will always contain some unconverted material. To obtain complete hydrogenation in this manner can require extremely long residence times.

Accordingly, an object of this invention is to provide an improved continuous process for the hydrogenation of unsaturated materials.

A further object of this invention is to provide an improved process which will operate at a lower temperature and a lower pressure than other processes for the hydrogenation of polymeric feeds.

A further object of this invention is to provide a process for the hydrogenation of polymeric feeds wherein the hydrogenation requires a low residence time.

Other objects, aspects, as well as the several advantages of the invention will be apparent to those skilled in the art upon studying the following disclosure and the appended claims.

SUMMARY OF THE INVENTION

According to the invention, a continuous process is provided for the hydrogenation of polymeric feeds containing unsaturated polymer in solution using a homogeneous hydrogenation catalyst system by passing a solution of the polymer and catalyst through a hydrogen atmosphere in a zone packed with inert packing material.

In accordance with one embodiment of the invention, solid polymers such as butadiene-styrene copolymers are hydrogenated in solution containing a soluble organometal catalyst system in a reaction zone in which a solution of the polymer and catalyst is continuously trickled over a bed of packing in a hydrogen atmosphere.

In a specific embodiment of the invention, a solid polymer in solution with a homogeneous catalyst system is passed downwardly together with hydrogen in a liquid trickling phase through a column packed with inert packing material, the reaction mass is removed from a lower portion of the reaction zone and is separated into a solvent phase and a polymer phase.

A method has now been found by which hydrogenatable unsaturated polymers can be hydrogenated to essential completion on a continuous basis with minimum residence times and under relatively mild conditions. This is accomplished by using a trickle-bed mode of contact wherein the polymer to be hydrogenated is admixed with a homogeneous hydrogenation catalyst, is dispersed in a suitable liquid solvent, and is downwardly passed through a vertical tower which is packed with an inert column packing materials. The liquid is allowed to trickle over the bed of packing material and through a continuous gas phase of free molecular hydrogen which is contained under pressure in the tower. The feed rate, the height of the tower, and the conditions of temperature and pressure can easily be controlled to insure the desired level of hydrogenation, including complete hydrogenation, of the effluent polymer. A significant advantage of this very effective yet relatively simple continuous technique is that it is possible to apply close surveillance and control of product quality and to apply timely corrective action, when needed, by relatively simple adjustments of conditions, to insure maximum product quality.

DESCRIPTION OF PREFERRED EMBODIMENTS

The polymeric materials which are suitable for conversion according to the process of this invention are hydrogenatable unsaturated normally solid polymers which can be dissolved or otherwise dispersed in a suitable solvent so as to form a liquid phase under the conditions of the hydrogenation. These polymers can be hydrocarbon polymers prepared from monoolefinic and/or polyolefinic monomers. Some examples of such monomers are ethylene, propylene, butene-1, hexene-1, octene-1, styrene, 1,3-butadiene, isoprene, and the like, and mixtures thereof. These polymers can be rubbery or resinous and can be homopolymers, copolymers, terpolymers, and the like. Copolymers can contain either a random or a block configuration. Thus, the present invention can be utilized to modify the properties of homopolymers such as polyethylene and polypropylene, even though unsaturation in such materials is relatively small, as well as hydrogenating the many variations of copolymers of butadiene and styrene and the like. The invention has been shown to be particularly effective for hydrogenating butadiene/styrene copolymers, such that essentially all of the vinyl, cis-, and trans-unsaturation is eliminated while essentially retaining all of the unsaturation of the pendant phenyl groups in the polymer molecule. Of course, even the unsaturation of the phenyl groups could be hydrogenated, if desired, by using more severe conditions.

For use in the invention process, the polymer must be dispersed in a suitable solvent such that a polymer-containing fluid is present in the reaction zone. Inert solvents, such as paraffinic hydrocarbon solvents, can be used for this purpose. In some instances of mild hydrogenation conditions even aromatic solvents can be used. Exemplary of such solvents are heptane, octane, decane, cyclohexane, benzene, toluene, xylene, and the like. The concentration of the polymer in the solvent is relatively unimportant, being sufficiently concentrated for economy, yet sufficiently dilute so as to insure a liquid phase under reaction conditions on the tower.

The catalysts which are applicable for use in the present process are those catalysts which have activity for hydrogenation and which are capable of being homogeneously dispersed in a solvent such as a hydrocarbon solvent. By homogeneous dispersion, it is meant to include those catalyst systems which are truly soluble in a hydrocarbon as well as those which form homogeneous colloidal dispersions in a solvent. A large number of such homogeneous catalyst systems are known. These generally cotain a compound of a metal of Group IV-B, V-B, VI-B, VII-B or VIII in admixture with compounds of other metallic or non-metallic elements.

One class of such catalysts is the reaction product resulting from the admixture of a hydrocarbon-soluble cobalt compound and a hydrocarbyl-substituted Group V-A element. Some examples of these are cobalt acetate and phenyldiethylphosphine dicobalt octacarbonyl and tributylarsine, cobalt acetate and 1,2-bis (diphenylphosphino) ethane, and the like.

Another suitable class of catalysts is the reaction product of a hydrocarbon-soluble alkoxide of a Group IV-B, V-B, VI-B, VII-B, or VIII metal with a trihydrocarbyl-aluminum compound.

A particularly effective class of homogeneous catalysts is one obtained by the admixture of a reducing organo compound of a metal of Group I-A, II-A, or III-A, and a group VIII metal salt of a carboxylic acid. Such a catalyst system is described in U.S. Patent 3,513,152, issued to John Paul Hogan. Some examples of these are nickel octoate and triethylaluminum, nickel acetate and trimethylaluminum, cobalt naphthenate and dimethylmagnesium, ferric stearate and n-butyllithium and the like.

The tower in which the hydrogenation process of the present invention is carried out is a vertically-positioned column, suitable for operating under pressure, and containing a feed inlet near the top and a feed exit near the bottom. The column can be packed with any suitable inert material which will prevent channeling and which will provide a trickling action for the descending liquid phase. Conventional column packing materials such as stainless steel, ceramics, carbon, and the like can be used. These packing materials can be in such conventional forms as rings, saddles, spheres, and the like. Sufficient void space is present to provide for a continuous hydrogen gas phase through which the liquid can trickle.

The column will have a hydrogen inlet in one or more locations either near the top or near the bottom of the column. If a less than pure stream of hydrogen is used for the hydrogenation, for example hydrogen diluted with an inert gas such as nitrogen, the column will be provided with at least one gas vent through which hydrogen-depleted gas can be removed. If mixtures containing hydrogen are used, it is generally preferred to introduce the hydrogen-containing mixture at the bottom of the column and to vent the hydrogen-depleted gas at the top. The length of the column will be sufficient to obtain the desired residence time in the reaction zone and will generally be in the range of about 8 to about 50 diameters long.

According to the process of the invention, the polymer solution, premixed with catalyst, is introduced into the top of the tower and allowed to trickle down over the packing to the bottom of the tower and into a suitable receiver or effluent pipe. Depending upon the specific catalyst used, the specific feed and the desired degree of hydrogenation, the reaction zone is maintained at a temperature in the range of from about 100 to about 600° F., preferably from about 150° F. to about 350° F. The column is maintained at a hydrogen pressure in the range of from about 50 to about 1000 p.s.i.g., preferably from about 100 to about 500 p.s.i.g. The temperature and pressure will be such as to maintain a liquid phase within the reactor. The feed rate, the type of packing, and the length of the column will be such that the average residence time of the polymer solution in the reaction zone of the column will generally be in the range of about 0.1 to about 30 minutes, preferably from about 1 to about 10 minutes. In any event, the feed rate will be such that the tower will always be in a less than liquid-full condition.

The concentration of the catalyst in the polymer solution will vary depending upon the catalyst and polymer and column conditions, but will generally be in the range of from about 0.01 to about 10 parts nickel per 100 parts polymer by weight (php.). The catalysts are sensitive to poisons such as oxygen and water and the level of catalyst usage will depend somewhat upon the poison level of the feed.

After leaving the reaction zone, the polymer can be recovered and isolated using conventional techniques. For example, the hydrogenated effluent from the reaction zone can be treated with water and other agents such as ammonium phosphate, to destroy the catalyst. The liquid organic phase can be filtered to remove the catalyst residues and the filtrate can then be stripped of solvent to recover the solid hydrogenated polymer.

Example 1

To first demonstrate the typical effectiveness of a prior art batch autoclave method for hydrogenating an unsaturated polymer, about 500 ml. of a polymer solution, containing about 5.4 grams of polymer per 100 ml., were charged into an autoclave together with a catalytic quantity of nickel octoate. The polymer, in cyclohexane, was a 40/60 weight ratio of butadiene/styrene copolymer having a molecular weight of about 75,000. The nickel octoate was present in an amount corresponding to 0.7 weight parts of nickel per 100 parts of the polymer (php.). Accompanying the nickel was the catalytic adjuvant, triethylaluminum, in an amount corresponding to 2 moles of aluminum per mole of nickel. The autoclave was flushed with nitrogen and the reaction mixture was heated to the hydrogenation temperature and under the desired hydrogen pressures. Several runs were carried out under varying conditions. Periodically, samples were withdrawn from the reaction mixture and tested for the degree of hydrogenation by infrared analysis. Hydrogenation was considered complete when no more than 2% of the trans-unsaturation remained (98% hydrogenation). The trans-unsaturation was measured because it is the last of the olefinic unsaturation to be converted. Under these conditions, the aromatic unsaturation was essentially unchanged.

The results of these runs are shown in the accompanying Table 1.

The data in the table indicate that, for these runs, complete hydrogenation was generally obtained sometime after the 15 minute sampling but before the 30 minute sampling.

Example 2

The following is an example illustrating the continuous trickle-bed dehydrogenation process of the present invention.

Using essentially the same unsaturated copolymer and the same catalyst described in Example 1 above, several hydrogenation runs were carried out, under varied conditions, in a trickle-bed hydrogenation column. The column was a 2-inch diameter pipe, six feet long, packed with ¼-inch ceramic saddles. A steam jacket was installed around the column to maintain the desired temperature in the column. The catalyst was premixed with the feed and charged into the top of the column with the hydrogen. After a residence time within the column of about 4 minutes the reaction mixture was discharged into a separator for the removal of the residual volatile gases.

The essential data and the results of these runs are also shown in Table 1 for easy comparison with the data and results of the batch process of Example 1.

TABLE 1.—COMPARISON OF BATCH AUTOCLAVE HYDROGENATION AND CONTINUOUS TRICKLE BED HYDROGENATION

|  | Batch | | | Continuous trickle bed | | |
|---|---|---|---|---|---|---|
| Run | 1 | 2 | 3 | 4 | 5 | 6 |
| Temperature, °F | 250 | 200 | 175 | 150 | 200 | 200. |
| Pressure, p.s.i.g | 225 | 225 | 225 | 100 | 200 | 300. |
| Polymer concentration, g./100 ml. solution | 5.4 | 5.4 | 5.4 | 15 | 15 | 15. |
| Nickel, p.h.p | 0.7 | 0.7 | 0.7 | 0.2 | 0.2 | 0.1. |
| Time/percent hydrogenation | 15 min./5%, 35 min./98% | 15 min./98%, 30 min./98% | 30 min./90%, 45 min./98% | 4 min./99 | 4 min./99.5 | 4 min./98. |

Examination of the results of the batch process and the results of the continuous process using the trickle-bed mode clearly show the advantages of the latter process. A more concentrated polymer solution is hydrogenated to a higher degree, at lower temperatures, and at lower pressures, using less catalyst, and in a shorter period of time, than using the batch autoclave process.

Example 3

To demonstrate that similar results cannot be obtained if the homogeneous catalyst is replaced by a solid catalyst even though the trickle-bed mode is maintained, still another comparison run was carried out.

A column, about 12 inches long and about ⅝ inch in diameter, was charged with ⅛ inch by ⅛ inch pellets of a very reactive solid hydrogenation catalyst. The catalyst was a high nickel catalyst supported on calcium aluminate and its activity was such that it was capable of completely hydrogenating benzene at 225° F.

A polymer solution, similar to that of Example 1, was trickled through this column, at about 2 ml./min., at various conditions which included temperature up to 390° F. and hydrogen pressures up to 480 p.s.i.g. Infrared examination of the polymer showed that practically no hydrogenation took place.

Using the invention process, on the other hand, complete hydrogenation of the olefinic unsaturation of such a polymer can be obtained at about 225° F. and at about 300 p.s.i.g.

I claim:

1. A process for the hydrogenation of polymers which comprises:
   (a) continuously passing a solution of a soluble unsaturated hydrocarbon polymer together with a homogeneous dispersion of a hydrogenation catalyst comprising complexes of metals of Groups IVb, Vb, VIb, VIIb and VIII in an inert diluent in a liquid trickling phase downwardly through a reaction zone packed with inert packing material, which will provide a trickling action for the descending liquid phase, in a hydrogen atmosphere at a temperature and a hydrogen pressure sufficient to maintain a liquid phase within said reaction zone,
   (b) subjecting said solution to hydrogenation within said zone as said descending liquid phase trickles downwardly through said inert packing material to hydrogenate polymer unsaturation and produce a hydrogenated polymer, the average residence time for said solution in said reaction zone being in the range 0.1 to about 30 minutes,
   (c) removing the reaction effluent containing hydrogenated polymer from a lower portion of said reaction zone and passing same to a separation zone, and
   (d) recovering hydrogenated polymer as product of the process from said effluent in said separation zone.

2. A process according to claim 1 wherein said polymer is a butadiene-styrene copolymer in solution in a hydrocarbon diluent, said temperature is in the range 150–350° F., said pressure is in the range 100–500 p.s.i.g., and said residence time is in the range 1–10 minutes.

3. A process according to claim 1 wherein said polymer is a polymer of butadiene and styrene in solution in a hydrocarbon diluent, said hydrogenation catalyst is a nickel octoate-triethylaluminum catalyst system, the concentration of said catalyst in said solution being from about 0.01 to about 10 parts nickel per hundred parts polymer by weight, said temperature is in the range 100 to 600° F., and said hydrogen pressure is in the range 50–1000 p.s.i.g.

4. A process according to claim 3 wherein the solution of polymer and catalyst is passed over the inert material at a temperature in the range 150–350° F. and the inert packing material is the type that will prevent channeling and which will provide a trickling action for the descending liquid phase.

5. A process according to claim 4 wherein the effluent removed from said reaction zone is treated to inactivate the catalyst and subjected to filtration to remove catalyst residue and the filtrate is stripped of solvent leaving hydrogenated polymer as product of the process.

References Cited

UNITED STATES PATENTS

| 3,130,237 | 4/1964 | Wald. |
| 3,131,212 | 4/1964 | Biller _____ 260—690 X |
| 3,205,278 | 9/1965 | Lapporte. |
| 3,497,327 | 2/1970 | Kehse _____ 260—690 X |

JAMES A. SEIDLECK, Primary Examiner

W. F. HAMROCK, Assistant Examiner

U.S. Cl. X.R.

260—80.78, 88.2 S, 93.5 A, 93.7, 94.9 GD, 94.7 H, 96 H, 690, 696; 252—472